US005971908A

United States Patent [19]

Scheuber et al.

[11] Patent Number: 5,971,908

[45] Date of Patent: Oct. 26, 1999

[54] LABORATORY CENTRIFUGE WITH ELECTRIC MOTOR

[75] Inventors: Joachim Scheuber, Hamburg; Juergen Koeppel, Grosshansdorf; Jochen Beese, Norderstedt; Rolf Kleemann, Elmenhorst, all of Germany

[73] Assignee: Eppendorf-Netheler-Hinz GmbH, Hamburg, Germany

[21] Appl. No.: 09/046,187

[22] Filed: Mar. 23, 1998

[30] Foreign Application Priority Data

Mar. 29, 1997 [DE] Germany .......................... 197 13 269

[51] Int. Cl.$^{6}$ ........................ B04B 9/02

[52] U.S. Cl. ........................ 494/84

[58] Field of Search .................... 494/16, 84; 210/512.1, 210/380.1; 310/67 R, 51, 91, 268, 74, 93, DIG. 6

[56] References Cited

U.S. PATENT DOCUMENTS 5,505,684 4/1996 Piramoon .................................. 494/16
5,683,341 11/1997 Giebeler .................................. 494/16

*Primary Examiner*—W. L. Walker
*Assistant Examiner*—Terry K. Cecil
*Attorney, Agent, or Firm*—Walter C. Farley

[57] ABSTRACT

A laboratory centrifuge has a centrifuge rotor supported on a stator and rotatable on a bearing about an axis of rotation. An electric motor drives the rotor and has pole pieces at a stationary part mounted on the stator and a rotatable part directly attached to the rotor, the stationary part having pole pieces with drive coils. The pole pieces magnetically act through a gap between the pole pieces and the rotatable part, and the gap lies in a surface which is perpendicular to the axis of rotation or forms a shallow frustocone opening either upwardly or downwardly.

20 Claims, 2 Drawing Sheets

LABORATORY CENTRIFUGE WITH ELECTRIC MOTOR

FIELD OF THE INVENTION

This invention relates to a centrifuge having a rotor rotatable on a bearing about an axis of rotation and supported on a stator and with an electric motor driving the stator and having pole-pieces at a stationary part fixed to the stator and a rotatable part directly fixed to the rotor, the stationary part having pole pieces with drive coils, the pole pieces magnetically entering the rotatable part through a gap surface.

BACKGROUND OF THE INVENTION

A centrifuge of this general type is known from U.S. Pat. No. 5,505,684 in which a rotatable motor part is directly fixed to the rotor instead of being attached to it by means of an intermediate shaft as in older designs. As a result, high compactness is achieved, which is especially appropriate for small laboratory centrifuges.

In the known device, the static part of the electric motor is mounted radially inside the rotor. The consequence is a conventional motor with a cylindrical gap concentric with the axis of rotation, however in this instance entailing substantial drawbacks.

If for high motor efficiency the gap is made narrow, then rotor vibrations caused by imbalances relative to the stator must be suppressed. Therefore the known design provides a bearing rigidly joined to the stator. All the generated vibrations are transferred to the stator. This design offers no way to spring-dampen the vibrations inside the centrifuge.

Moreover the entire electric motor is concentrically enclosed by the rotor. Heat problems arise on that account. Because of long and high motor loads, the heat generated inside the rotor essentially can only be dissipated through the rotor. Test samples present inside the rotor will be heated: this feature in general is unacceptable.

The conventional motor design with a cylindrical gap moreover constrains the electric motor within the available space inside the rotor: for instance, the coils must be wound in a complex manner onto the pole pieces. In addition, the radially inward space available for the pole pieces and the coils decreases rapidly and considerable problems of mounting space and size arise, entailing heat problems and limits on motor output. Therefore only those electric motor designs are applicable that offer high efficiency, but these are also complex and costly.

SUMMARY OF THE INVENTION

An object of the present invention is to provide a centrifuge of the above-mentioned type which, while being highly economical to manufacture, also reduces heating effects.

In accordance with the invention, the electric motor is a flat-construction or pancake motor, that is with a gap surface lying in a plane substantially perpendicular to the axis of rotation, i.e. rigorously perpendicular or at a slight angle as a shallow or nearly flat conical surface. The rotatable part and the stationary part of the electric motor are in the form of substantially planar components mutually opposite one another at the gap surface and the magnetic fields generated by the pole pieces essentially pass perpendicularly to the gap surface as required in electric motors.

Thus, the rotor can be mounted on one side of the gap surface on the rotatable motor part regardless of motor design. Of particular importance, the motor is not confined, as it is in conventional designs, by the enclosing rotor. The motor may be of very large diameter and accordingly high torques and power may be achieved with a simple design.

The peripherally outwardly open gap and the large surface of the motor of the invention make possible very low heat generation and heat transfer to the rotor and hence minute thermal effects on the centrifuged test samples.

The gap, which is essentially perpendicular to the axis of rotation, furthermore tolerates rotor vibrations relative to the stator, the vibrations usually being perpendicular to the axis of rotation, that is, in a direction parallel with the gap and being easily tolerable even when the gap is narrow, without making contact in the gap.

Advantageously, a spring is mounted between the rotor and a support bearing. Illustratively, such a spring may consist of leaf spring elements positioned so that only rotor displacements perpendicular to the axis of rotation (that is, parallel displacements of the axis of rotation) are possible while effectively suppressing tipping motions that might lead to contact. As a result, and especially when the centrifuge speed rises through critical ranges of speeds, stator vibrations that might induce the full centrifuge to jump and migrate across the bench, are effectively avoided.

The pole pieces of the stationary part and the coil axes are preferably parallel with the axis of rotation so that they optimally generate magnetic lines of force passing perpendicularly through the gap surface and so that they facilitate simple construction, wherein the fitting of the pole pieces with coils and also assembly of the centrifuge components can take place in the direction of the axis of rotation.

The coils are advantageously attached to a common circuit board which is essentially perpendicular to the axis of rotation and has passages for the pole pieces. Together with the remaining electronic components used for motor control, the coils can be mounted on the circuit board which mounted by its apertures and in the direction of the axis of rotation over the pole pieces. Thereby substantial savings in product costs are made possible.

The large-surface design of the motor allows using a reluctance motor including a rotatable part spanning two pole pieces of the stationary part and comprising magnetically highly permeable material, an economical low-efficiency motor, so that construction is substantially simplified. The rotatable part of the electric motor may be a simple metal sheet of appropriate configuration and illustratively may be affixed in simple manner by gluing to the bottom of the rotor.

With a rotatable part of asymmetric shape, the same direction of rotational startup can always be achieved when turning the motor ON. Complex startup devices to achieve this effect are thus avoided.

The pole pieces can be integral projections of a wound permeable metal sheet core. As a result, the construction of the pole pieces is simple, and eddy currents are minimized by the sub-division in adjacent laminations, whereby heat generation is advantageously reduced.

A magnetically displaceable drive means can be displaceably supported in the vicinity of one of the pole pieces. In this manner, the pole pieces of the electric motor can be used as an auxiliary drive using a drive component, for instance, to lock the cover of the centrifuge, the cover necessarily being locked during operation for safety.

Safety is increased by using the cover lock, because the drive component will be displaced only when the two adjacent pole pieces are turned ON simultaneously, such a feature being impossible for motor operation with alternatively driven pole pieces. This feature assures that the drive component can be actuated only when the motor is shut OFF into special operation of the pole pieces.

BRIEF DESCRIPTION OF THE DRAWINGS

The invention is shown illustratively and schematically in the drawings wherein.

DESCRIPTION OF PREFERRED EMBODIMENTS

Figure 1:
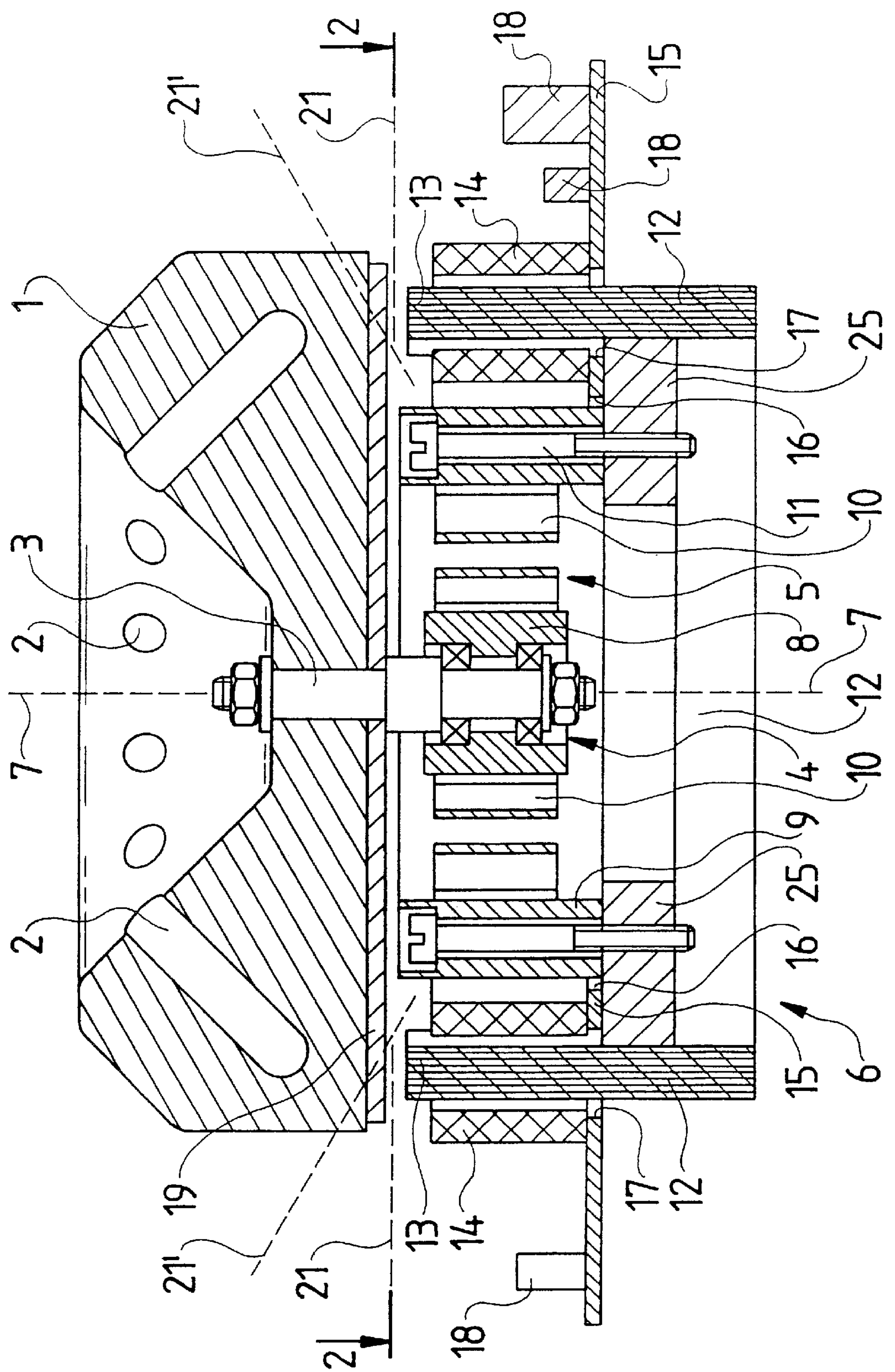
FIG. 1 is a side elevation in axial section of an embodiment of a centrifuge in accordance with the invention, the section passing through line 1—1 in FIG. 2

The shown centrifuge comprises a rotor 1 shown in merely schematic manner. Illustratively, this rotor may be a solid molded body assuming the shape shown. The rotor 1 is fitted with seats 2 pointing obliquely outwardly to a recess accessible from the top to hold test samples to be centrifuged.

Rotor 1 is attached to and carried by a shaft 3 which is supported by a bearing 4, the bearing being connected through a spring assembly 5 to a centrifuge stator 6.

For pictorial clarity, a housing which would normally enclose the assembly is omitted from these drawings.

As shown by FIG. 1, shaft 3 mounted in the axis of rotation 7 of the centrifuge is held in the bearing 4 in two axially separated bearing supports and is radially braced against them as shown in FIG. 1. The two supports, denoted conventionally in this section by crosses, are externally held in an inside ring 8 of spring 5.

Figure 2:
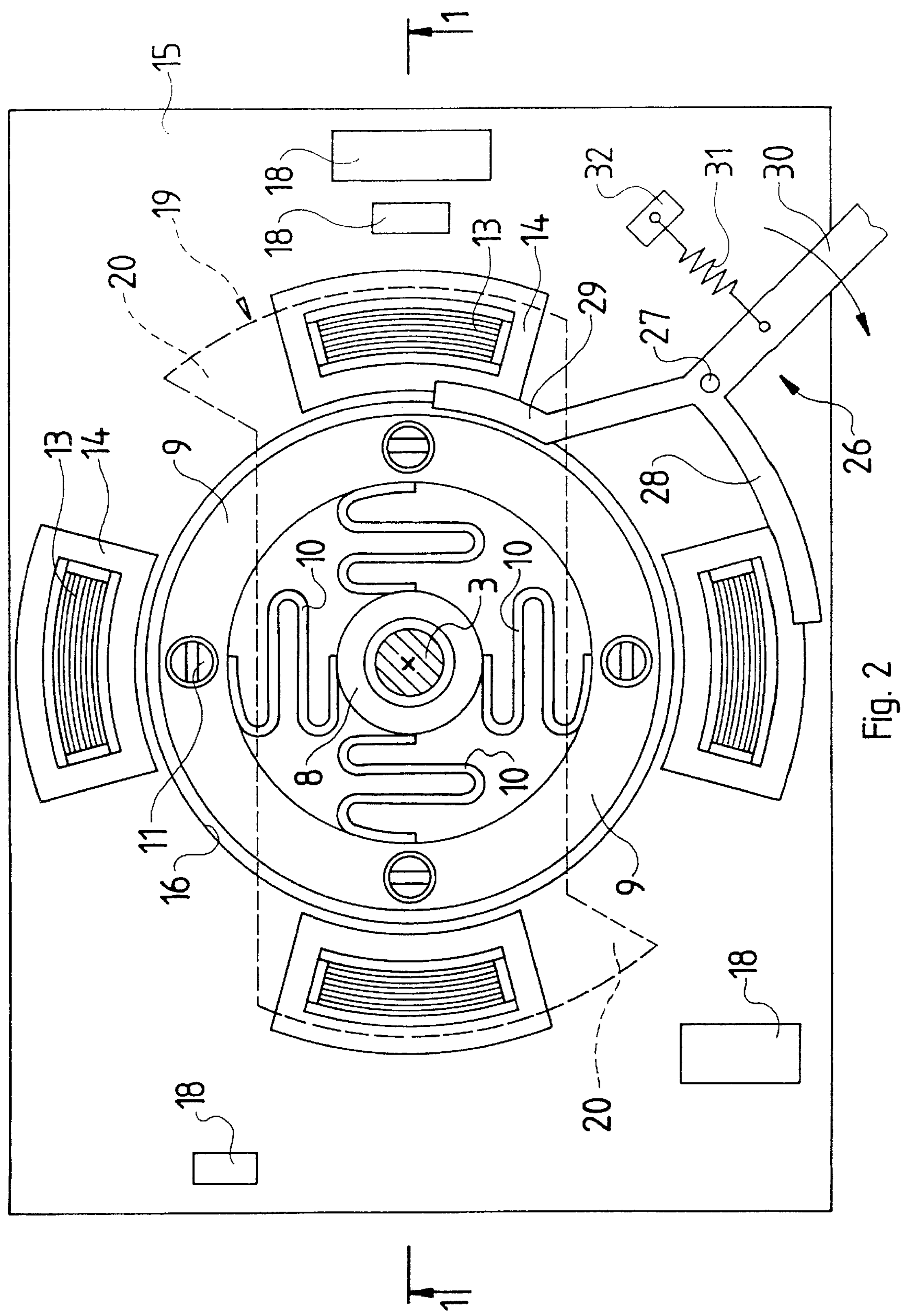
FIG. 2 is a plan view in section through the gap and taken along line 2—2 of FIG. 1.

Spring assembly 5 comprises an outer ring 9 attached to inner ring 8 by four S-shaped leaf spring elements 10 as shown in the plan view of FIG. 2. As shown in cross-section in FIG. 1, leaf springs 10 are thin but very high in a direction parallel with axis of rotation 7, thereby allowing the shaft 3 to be displaced parallel with the axis of rotation, so that the springs suppress very effectively any tipping motion. Outer ring 9 of spring assembly 5 is attached to stator 6 to which it is affixed by screws 11.

Stator 6 comprises an annular core 12 coaxial with the axis of rotation and milled out in its upper part as far down as about half its height while forming four pole pieces 13 projecting upward from annular core 12. The annular core 12 with the pole pieces 13 is wound of magnetically highly permeable metal sheet to preclude eddy currents. This core forms the magnetic return between the individual pole pieces 13. Each pole piece 13 is enclosed by a coil 14.

A support ring 25 engaged by the screws 11 is fixed inside annular core 12 and carries outer ring 9 of spring assembly 5.

Coils 14 are mounted on a circuit board 15 which encloses spring assembly 5 with an inside clearance 16 and surrounds pole pieces 13 with passages 17. Circuit board 15 can rest in the simple manner shown in FIG. 1 on stator 6 and can be fixed to it by means not shown in the drawing, for instance by gluing.

Pole pieces 13 of stator 6 extend parallel with the axis of rotation, that is they are perpendicular to annular core 12 of the stator. The axes of coils 14 also extend in this direction. The circuit board may be equipped with coils 14 and with further components 18 of the motor electronics, and it may be prefabricated. Then it can be deposited in the direction of axis of rotation 7 on the poles.

In the centrifuge shown, the electric motor is a reluctance motor. Its rotatable part is a magnetically highly permeable sheet of metal 19. As shown by FIG. 1, this metal sheet may be fixed to the underside of rotor 1 for instance by gluing. It must be shaped so that it spans two poles 13 as indicated in FIG. 2 by the dashed metal sheet 19. In the four-pole piece design of FIG. 2, the motor electronics will always switch from two diametrically opposite pole pieces to two pole pieces shifted by 90° and, as a result, metal sheet 19 is made to rotate.

As shown by FIG. 2, the opposite pole pieces of metal sheet 19 are asymmetrical with lateral corners 20. These corners entail asymmetrical magnetic coupling to the pole pieces, ensuring that when the motor is turned ON, the motor always starts up in the same direction.

As shown by FIG. 1, metal sheet 19 forming the rotatable part of the electric motor is mounted in a plane perpendicular to axis of rotation 7. It is a distance away from a gap denoted by the dashed line 21 and it is located opposite the stator 6 and the stationary part of the motor affixed to the stator, namely pole pieces 13 and coils 14.

In the embodiment shown FIG. 1, gap 21 is rigorously planar and perpendicular to the axis of rotation 7. However, depending on the shapes of the rotatable and stationary parts subtending this gap, it may also subtend a slight angle as indicated by the lines 21' to form a shallow substantially conical surface, either an upwardly opening conical surface as shown in FIG. 1 or else a downwardly open cone. Even when the gap surface 21' is substantially conical, the gap still allows substantial sideways vibrations of the rotor relative to the stator without contact being made in the gap. As will be recognized, the surfaces forming the gap may be in steps in its radial and axial directions and still be substantially conical. For instance, the gap may be wider in its radially inner zone, in order to secure therein more space for the bearing means.

The arrangement shown is also substantially insensitive to contact caused by tipping vibrations even when these cannot be fully suppressed by spring 5. As shown by FIG. 1, metal sheet 19 may, for instance, come to touch the top side of outer ring 9 of spring 5. Such contacts are harmless. Such touching surfaces may be fitted with slip rings, not shown, that catch without destruction even extreme tipping vibrations.

As shown by FIG. 2, the centrifuge may be equipped with an additional drive making use of electric motor pole pieces 13 which are present anyway to generate the drive force. This is shown in FIG. 2.

A Y-lever 26 is rotatably supported on a shaft 27 parallel with axis of rotation 7 and illustratively affixed to the circuit board 15. Two arms 28 and 29 of the Y-lever 26 enter the vicinity of two adjacent pole pieces 13. A third arm 30 is urged by a spring 31 affixed at 32.

When the two adjacent electric-motor pole pieces 13 adjacent to the arms 28 and 29 of Y-lever 26 are simultaneously turned ON by the motor electronics illustratively mounted on circuit board 15, the force of attraction acting on the Y-lever 26 suffices to overcome that of spring 31. The arm 30 is then rotated clockwise by an angle and is able to implement by its free end, shown broken off, the locking or unlocking of the centrifuge cover. When the electric motor is driven to operate the centrifuge, the pole pieces always are driven alternatively. Then only one of the pole pieces cooperating with Y-lever 26 is powered. In this process the return force of the spring 31 cannot be overcome. Only when the centrifuge is standing still, namely when normal motor operation has been shut off, will it be possible by means of a special drive procedure to simultaneously drive the two adjacent pole pieces acting on Y-lever 26.

In a simpler design, moreover, one of the arms 28, 29 may be eliminated, whereby, with a corresponding inert design of the lever, a permanent actuation for purposes of locking is in effect during normal motor operation.

What is claimed is:

1. A laboratory centrifuge comprising a centrifuge rotor (1) having a shaft (3);

a bearing (4) rotatably supporting said shaft and said centrifuge rotor for rotation about an axis of rotation (7); and an electric motor comprising a stator (6) supporting said bearing and having pole-pieces (13) attached to said stator, a rotatable part (19) directly attached to and rotatable with said centrifuge rotor, said pole pieces (13) having drive coils (14) with ends defining a gap between said ends and said rotatable part, said pole pieces magnetically acting on said rotatable part through said gap, said gap lying in a plane (21) which is substantially perpendicular to said axis of rotation.

2. A centrifuge according to claim 1 and comprising a spring assembly (5) attaching said bearing (4) to said stator (6), said spring substantially allowing only displacements of said shaft perpendicular to said axis of rotation (7).

3. A centrifuge according to claim 1 wherein said pole pieces (13) of said stator and axes of said coils (14) extend substantially parallel to said axis of rotation (7).

4. A centrifuge according to claim 3 wherein said coils (14) are attached to a common circuit board (15) lying in a plane substantially perpendicular to said axis of rotation (7) and having through passages (17) for said pole pieces (13).

5. A centrifuge according to claim 1 wherein said electric motor is a reluctance motor comprising a rotatable part (19) spanning two pole pieces (13) of said stator and comprising magnetically highly permeable material.

6. A centrifuge according to claim 5 wherein said rotatable part (19) has an asymmetric shape (20) at radially outward ends spanning said pole pieces (13).

7. A centrifuge according to claim 1 wherein said pole pieces (13) are integral projections of a wound permeable metal sheet annular core (12).

8. A centrifuge according to claim 1 and including a magnetically displaceable drive means (26) movably supported in a direction of actuation with an arm (28) adjacent a first one of said pole pieces (13).

9. A centrifuge according to claim 8 wherein said drive means (26) has a second arm (29) adjacent a second one of said pole pieces (13) and a return spring (31) whereby, when said first and second pole pieces (13) are magnetized, said drive means actuates an unlocking mechanism against a force of said return spring (31) which force can be overcome only upon simultaneous magnetization of both of said first and second poles.

10. A laboratory centrifuge comprising a centrifuge rotor (1) having a shaft (3);

a bearing (4) rotatably supporting said shaft and said centrifuge rotor for rotation about an axis of rotation (7); and an electric motor comprising a stator (6) supporting said bearing and having pole-pieces (13) attached to said stator, a rotatable part (19) directly attached to and rotatable with said centrifuge rotor, said pole pieces (13) having drive coils (14) with ends defining a gap between said ends and said rotatable part, said pole pieces magnetically acting on said rotatable part through said gap, said gap lying in a surface (21') which is substantially frustoconical and symmetrical around said axis of rotation.

11. A centrifuge according to claim 10 and comprising a spring assembly (5) attaching said bearing (4) to said stator (6), said spring substantially allowing only displacements of said shaft perpendicular to said axis of rotation (7).

12. A centrifuge according to claim 10 wherein said pole pieces (13) of said stator and axes of said coils (14) extend substantially parallel to said axis of rotation (7).

13. A centrifuge according to claim 12 wherein said coils (14) are attached to a common circuit board (15) lying in a plane substantially perpendicular to said axis of rotation (7) and having through passages (17) for said pole pieces (13).

14. A centrifuge according to claim 10 wherein said electric motor is a reluctance motor comprising a rotatable part (19) spanning two pole pieces (13) of said stator and comprising magnetically highly permeable material.

15. A centrifuge according to claim 14 wherein said rotatable part (19) has an asymmetric shape (20) at radially outward ends spanning said pole pieces (13).

16. A centrifuge according to claim 10 wherein said pole pieces (13) are integral projections of a wound permeable metal sheet annular core (12).

17. A centrifuge according to claim 10 and including a magnetically displaceable drive means (26) movably supported in a direction of actuation with an arm (28) adjacent a first one of said pole pieces (13).

18. A centrifuge according to claim 17 wherein said drive means (26) has a second arm (29) adjacent a second one of said pole pieces (13) and a return spring (31) whereby, when said first and second pole pieces (13) are magnetized, said drive means actuates an unlocking mechanism against a force of said return spring (31) which force can be overcome only upon simultaneous magnetization of both of said first and second poles.

19. A centrifuge according to claim 10 wherein said frustoconical surface opens upwardly.

20. A centrifuge according to claim 11 wherein said frustoconical surface opens downwardly.

* * * * *